United States Patent

Kubokawa

[11] Patent Number: 6,110,260
[45] Date of Patent: Aug. 29, 2000

[54] FILTER HAVING A CHANGE INDICATOR

[75] Inventor: James O. Kubokawa, St. Paul, Minn.

[73] Assignee: 3M Innovative Properties Company, St. Paul, Minn.

[21] Appl. No.: 09/115,319

[22] Filed: Jul. 14, 1998

[51] Int. Cl.⁷ .................................................. B01D 46/44
[52] U.S. Cl. ................................. 96/26; 96/414; 96/421
[58] Field of Search ........................... 55/DIG. 34; 95/25; 96/417, 414, 415, 416, 421, 117, 117.5, FOR 170, 26

[56] References Cited

U.S. PATENT DOCUMENTS

| | | | |
|---|---|---|---|
| Re. 30,782 | 10/1981 | van Turnhout et al. | 264/22 |
| Re. 31,285 | 6/1983 | van Turnhout et al. | 55/155 |
| 2,721,533 | 10/1955 | Alderfer | 116/112 |
| 2,753,831 | 7/1956 | Davies | 55/DIG. 34 |
| 2,782,747 | 2/1957 | Alderfer | 116/112 |
| 2,804,839 | 9/1957 | Hallinan | 116/112 |
| 2,849,005 | 8/1958 | Tucker et al. | 96/417 |
| 3,027,865 | 4/1962 | Kautz et al. | 116/114 |
| 3,254,784 | 6/1966 | Lancesseur | 96/415 |
| 3,635,001 | 1/1972 | Komroff et al. | 96/417 |
| 3,916,817 | 11/1975 | Kemp | 116/70 |
| 4,103,058 | 7/1978 | Humlicek | 428/171 |
| 4,130,487 | 12/1978 | Hunter et al. | 96/117.5 |
| 4,215,682 | 8/1980 | Kubik et al. | 128/205.29 |
| 4,321,070 | 3/1982 | Bede | 55/274 |
| 4,336,038 | 6/1982 | Schultheiss et al. | 55/DIG. 34 |
| 4,363,682 | 12/1982 | Thiebault | 156/181 |
| 4,547,420 | 10/1985 | Krueger et al. | 428/229 |
| 4,588,537 | 5/1986 | Klaase et al. | 264/22 |
| 4,592,815 | 6/1986 | Nakao | 204/165 |
| 4,795,668 | 1/1989 | Krueger et al. | 428/174 |
| 4,798,850 | 1/1989 | Brown | 521/134 |
| 4,880,448 | 11/1989 | Scherrer | 96/414 |
| 4,904,174 | 2/1990 | Moosmayer et al. | 425/174.8 E |
| 4,955,995 | 9/1990 | Pontius | 96/117.5 |
| 4,988,560 | 1/1991 | Meyer et al. | 428/297 |
| 5,009,308 | 4/1991 | Cullen et al. | 96/416 |
| 5,122,048 | 6/1992 | Deeds | 425/174.8 E |
| 5,230,800 | 7/1993 | Nelson | 210/496 |
| 5,325,707 | 7/1994 | Slater . | |
| 5,350,620 | 9/1994 | Sundet et al. | 428/172 |
| 5,401,446 | 3/1995 | Tsai et al. | 264/22 |
| 5,496,507 | 3/1996 | Angadjivand et al. | 264/423 |
| 5,505,753 | 4/1996 | Heysek | 96/417 |

FOREIGN PATENT DOCUMENTS

| | | |
|---|---|---|
| 0 241 438 A2 | 10/1987 | European Pat. Off. . |
| 0 428 400 B1 | 6/1995 | European Pat. Off. . |
| 44 13 148 A1 | 4/1995 | Germany . |
| 2 311 857 | 10/1997 | United Kingdom . |
| WO 88/01050 | 2/1988 | WIPO . |
| WO 97/30771 | 8/1997 | WIPO . |

OTHER PUBLICATIONS

Van Turnhout et al., Electret Filters for High–Effeciency and High–Flow Air Cleaning, *IEEE Transactions on Industry Applications*, vol. IA–17, No. 2, pp. 240–248 (Mar./Apr. 1981).

*Primary Examiner*—Duane S. Smith
*Attorney, Agent, or Firm*—David B. Patchett

[57] ABSTRACT

Disclosed is a change indicator for a filter for use in a gaseous circulation system, such as a forced air heating and cooling system. The change indicator includes an air impervious patch that is secured to the filter. The portion of the filter media adjacent to the change indicator changes appearance in response to the accumulation of contaminants at a much slower rate than the remainder of the air filter. The accumulation of contaminants progresses inwardly from the region adjacent the periphery of the change indicator towards the region adjacent to the center. Once the appearance of the filter media beneath the change indicator fully changes from periphery to the center, that is an indication that the air filter is in need of cleaning or replacement.

14 Claims, 7 Drawing Sheets

FILTER HAVING A CHANGE INDICATOR

FIELD OF THE INVENTION

This invention relates generally to filters and more specifically to filters having change indicators.

BACKGROUND OF THE INVENTION

Filters have been devised in the past to remove various particulate contaminants from a moving gas stream, and specifically for air streams. Such contaminants may, for example, include dust, lint, smoke, pollen or dander. For instance, in conventional Heating, Ventilating and Air Conditioning (HVAC) Systems, a filter is inserted into the air stream to remove contaminants carried along in the air stream. The filtered air may then be recirculated throughout the HVAC system.

Conventional air filters generally include a filter media constructed from a porous material, such as open cell foam or a non-woven web of materials such as fiberglass. As a stream of air is induced to flow through the filter, particulate contaminants are entrapped or separated from the air stream and accumulated on the filter media. After a period of use in this manner, the accumulated contaminants begin to interfere with the flow of the air stream through the filter. The increased pressure drop across the filter impedes the airflow through the air filter and potentially reduces the effectiveness of the entire HVAC system. This requires that the air filter be removed and either cleaned or replaced with a new air filter. However, typically the filter is hidden from view during normal use, making it difficult to determine the condition of the filter without removing it from the HVAC system for visual inspection. Visual inspection may be done periodically or on a predetermined schedule. However, visual inspection alone may not be entirely reliable since a filter may appear to be fully loaded with contaminants, when in fact only a portion of the capacity of the filter has been utilized.

However, devices have been provided in the past that generate a change signal to alert a user to the clogged condition of the filter and indicate the need for inspection, cleaning or replacement. Such devices include simple pressure sensors that measure the pressure on the downstream side of the filter and generate a signal if the pressure drops below a predetermined point. In another example, U.S. Pat. No. 4,321,070, issued to Bede, provides a whistle mounted in the filter. When the filter becomes sufficiently clogged, the air stream is induced to flow through the whistle portion at an increasing rate until an audible signal is produced. U.S. Pat. No. 2,782,747, issued to Alderfer, U.S. Pat. No. 2,753, 831, issued to Davies, and PCT patent application Ser. No. 88/01050 to Horowitz, all also disclose an audible change signal device.

U.S. Pat. No. 2,804,839 discloses a device external to the filter that produces both an audible change signal and visual change signal responsive to an elevated differential pressure drop on either side of the filter. The visual signal is evident external of the filter and does not require removal of the filter itself and visual inspection. However, this device is complicated and expensive relative to the price of the air filter itself and thus does not lend itself to widespread use.

U.S. Pat. No. 3,027,865, issued to Kuntz et al. incorporates a diaphragm that shifts position responsive to a change in the pressure drop across an air filter. The shift in the position of the diaphragm may be used to provide a visual signal or to close an electrical contact in order to provide an electrical signal externally of the filter. U.S. Pat. No. 3,916, 817 also discloses a device for providing a visual change signal.

However, none of these existing air filter change indicators are completely satisfactory. For instance, those that require elaborate and complicated apparatus to provide a change signal are relatively expensive, and may require setup at installation and periodic maintenance to ensure reliable operation. Those devices that depend on a reduction in airflow to provide an audible signal may be susceptible to clogging by the very contaminants that the air filter is designed to entrap. It is also generally not desirable to require modification to the air circulation system or to the air filter, as many of these approaches teach.

Moreover, all of these devices provide only one signal. That is, they only indicate when the air filter has reached a predetermined level of lowered performance. It may be desirable in certain situations to have a change indicator that provides a continuous and progressive indication of the performance of the filter.

SUMMARY OF THE INVENTION

The present invention provides a filter for filtering particulate contaminants from an air stream. The filter includes a filter media for filtering the particulate contaminants from the air stream. The filter media has a first major surface and a second major surface for airflow through the filter media from the first major surface to the second major surface. The filter includes an air impervious indicator patch having a first major surface and a second major surface, a periphery and a center. Means are provided that are adapted to support the indicator patch at a desired location adjacent to a portion of at least one of the first major surface or second major surface of the filter media. The indicator patch is adapted to impede the air flow through the filter media and divert the air stream so that contaminants are progressively accumulated in the filter media from the periphery towards the center of the air impervious indicator patch as an indication of use of the air filter.

In one embodiment of the invention, the indicator patch is attached to the filter with the second major surface of the indicator patch adjacent to the first major surface of the filter. At least a portion of the indicator patch is light transmissive to enable visual perception of the portion of the filter media adjacent the indicator patch.

In another embodiment of the invention, the indicator patch includes a layer of pressure sensitive adhesive on the second major surface of the indicator patch and the indicator patch is adhered to the first major surface of the filter media by the layer of pressure sensitive adhesive.

In another embodiment of the invention, the indicator patch is attached to the second major surface of the filter and the indicator patch may be opaque.

BRIEF DESCRIPTION OF THE DRAWING

The present invention will be further described with reference to the accompanying drawing wherein like reference numerals refer to like parts in the several views.

DETAILED DESCRIPTION OF THE INVENTION

Figure 1:
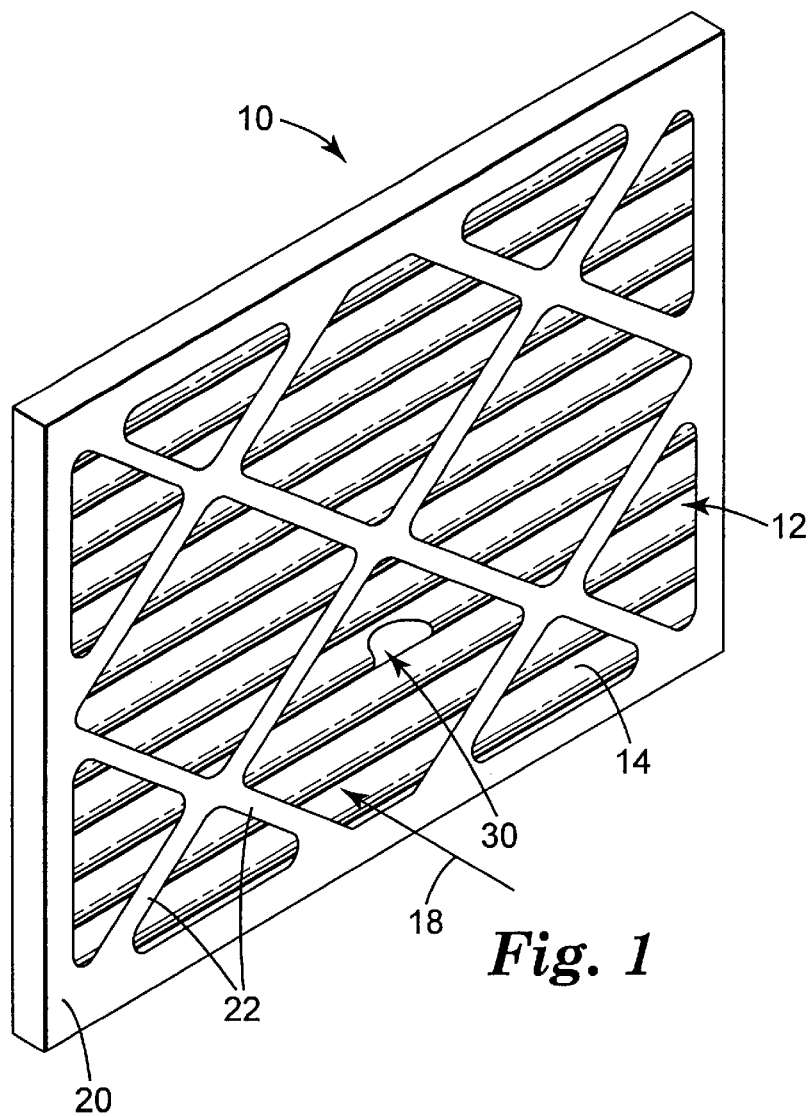
FIG. 1 is an isometric view of an air filter with a change indicator according to the present invention.
Figure 2:
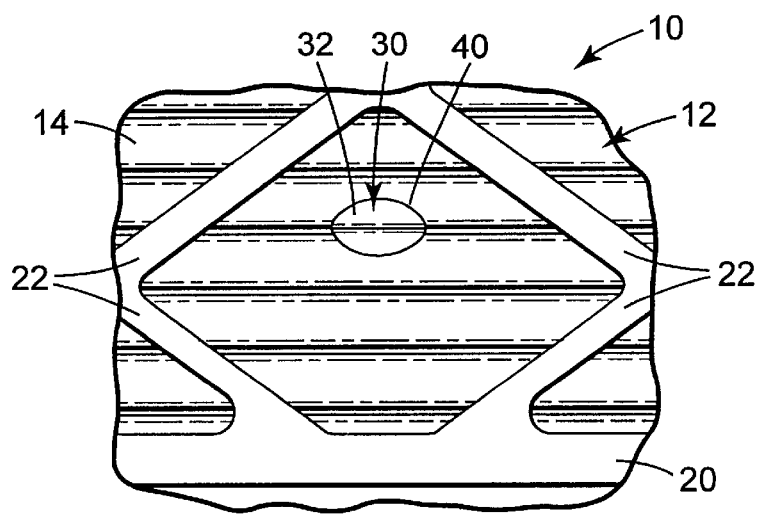
FIG. 2 is a magnified partial frontal view of the change indicator and air filter of FIG. 1.
Figure 3:
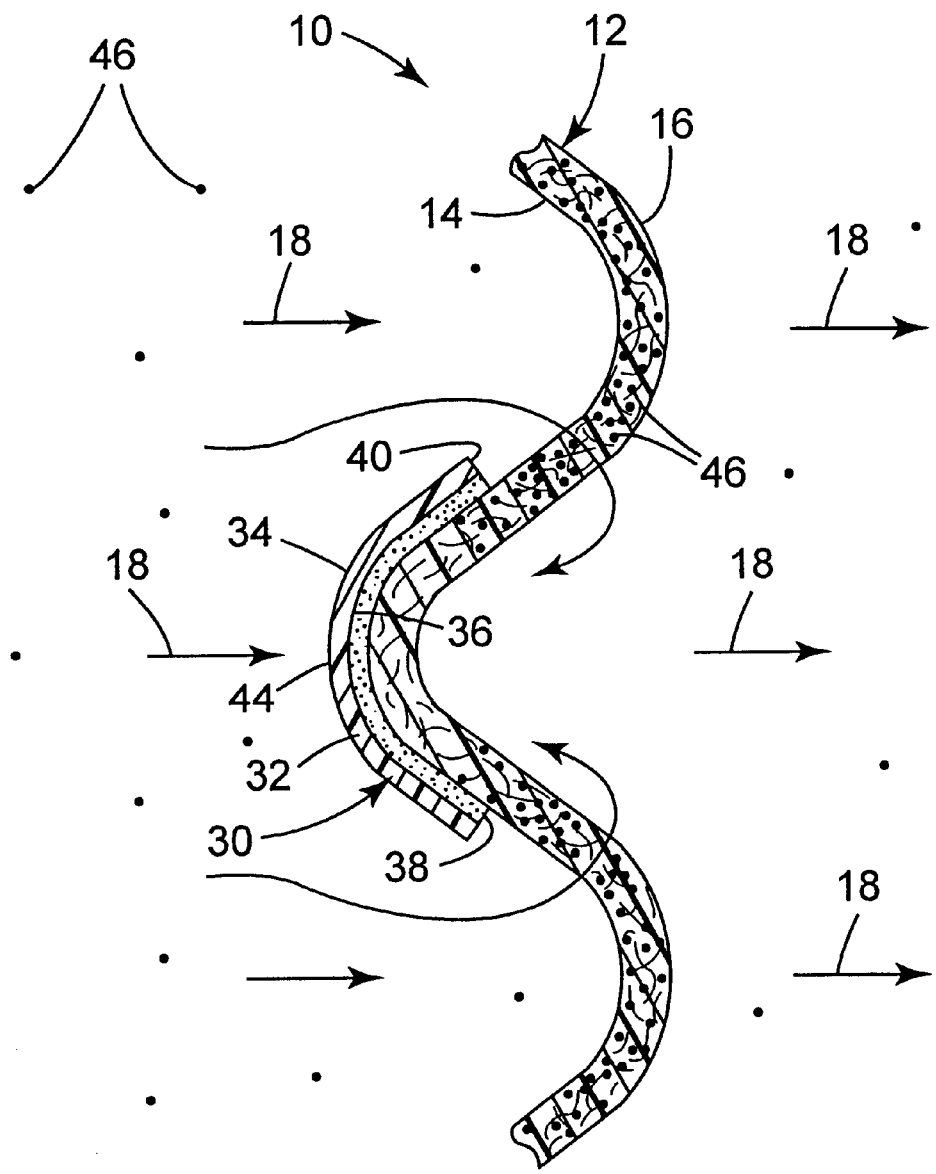
FIG. 3 is a magnified partial cross sectional view of the air filter and change indicator of FIGS. 1 and 2 in a first state.

Referring now to FIGS. 1 and 2, there is shown a filter 10 according to the present invention. For the purposes of this invention, the filter 10 will be generally referred to as an air filter, but it is to be understood that the present invention is equally applicable to any filter for use with a gaseous stream having particulate contaminants. Filter 10 includes a filter media 12 having a first major surface 14 and a second major surface 16 (not shown in FIG. 1). The filter media may be composed of any suitable material that may be utilized to filter particulate contaminants from a gas stream. The following is a non-exclusive list of such materials: Fiberglass, cotton/polyester blends, carded, air laid, spunbonded or needled nonwoven polymeric webs, blown microfibers, expanded foam, reticulated foam, woven or punched plastic screens, or combinations of the above materials.

In one preferred embodiment of the present invention, the filter media is comprised of a nonwoven web having electret fibers. Nonwoven webs of electret fibers are typically formed of loosely associated electret-charged fibers. The filters can be electrostatically charged prior to, during, or after being formed into a nonwoven web. For example, post-formation charging is described in U.S. Pat. No. 4,588,537 which charges a lofty nonwoven web which can be formed by a variety of methods including carding and melt blowing. The webs are charged while under compression and then permitted to return to their original loft.

Fibers can also be charged while they are being formed as disclosed in U.S. Pat. No. 4,215,682 (Kubik et al.), where melt-blown fibers are bombarded by ions or electrons immediately after being extruded from melt-blowing orifices. The fibers solidify extremely rapidly in the atmosphere and are collected as a semi-coherent mass of entangled microfibers as the fiber web. The fiber webs are described as preferably open to provide a low-pressure drop for liquid passing through a filter formed of the fibrous web.

Fibers can also be charged as described in U.S. Pat. No. 4,798,850. This patent describes blending different fibers together, which when properly selected will induce an electrostatic charge in the fibers as the fibrous web is formed. Other patents relating to charging fibers or fibrous webs include U.S. Pat. Nos. 4,904,174; 5,122,048; 5,401,446; 4,592,815; and 5,496,507.

A particularly effective method of forming a nonwoven electret fiber filter web is described in U.S. Reissue Pat. No. 30,782 (Van Turnout et al.). The electret fibers in this patent are formed from a corona charged film that is fibrillated to form the charged fibers. The charged fibers can then be formed into a nonwoven filter web by common methods such as carding or air laying. This charging method provides a particularly high density of injected charges in the finished fibers. However, problems are often encountered with forming webs from these precharged fibers. The fibers are generally quite large and uncrimped. They also have a resistance to bending. Due in part to these properties, the fibers resist formation into a uniform coherent web, particularly at low basis weights. This problem is partially addressed in U.S. Pat. No. 4,363,682, which proposes the use of such fibrillated fiber webs in facemask applications. In order to provide a more coherent web, as well as one that resists shedding fibers, this patent proposes a post-embossing treatment. This post-embossing welds the outer surface fibers together allegedly providing a more coherent and comfortable web for use as a facemask. However, this treatment will also tend to result in a more condensed web, which would increase pressure-loss across the filter web and decreases filter life.

An improvement over the embossing treatment is disclosed in U.S. Pat. No. 5,230,800. This patent proposes needle-punching the fibrillated electret fiber filter webs (e.g., prepared via the Van Turnout et al. method) onto a scrim support. The result is a consolidated coherent fibrous filter composite material with improved uniformity and filtration performance.

A nonwoven electret fiber filter media and filter is obtained by forming the filter media using a nonwoven web of electret fibers on an open scrim support. An unsupported nonwoven fibrous filter web is placed onto the open, substantially non-extensible, scrim support material. The scrim support material has individual discrete open areas with an average cross-sectional area as viewed from the plane of the filter media of at least 0.25 mm$^2$, preferably 1.0 mm$^2$, and a pressure drop across the scrim support, without the filter web, of less than 1.5 mm H$_2$O measured at 98.4 meters/min face velocity. The unsupported fibrous filter web and the scrim support are joined to form the filter media by needle-punching the filter web and scrim support material to provide a highly uniform nonwoven fibrous filter media with enhanced lifetime and filtration performance. At least certain of the fibers forming the nonwoven fibrous filter web are provided with an electret charge.

Referring now again to FIGS. 1 and 2, arrow 18 indicates the flow of air through the air filter 10. In one application of the present invention (not shown), the filter media is applied or suspended from a pre-existing structure. For instance, the filter of the present invention may take the form of a generally planar sheet mounted over the intake of a room air conditioner. Means may be provided to secure the filter in this position, such as mechanical clips or pressure sensitive adhesive tape. Another form of a filter to be used in regard to the present invention is a bag filter that is mounted about an aperture in a structure in a manner known in the art and through which a gaseous stream is ejected. Other filter forms may be utilized as part of the present invention as are found convenient or advantageous in a particular application.

More commonly, filter media 12 is a sheet like member supported by a surrounding frame 20 to which the periphery of the web is secured. For instance, as shown in FIG. 1, the frame may have a generally u-shaped peripheral cross-section (not shown) for receipt of the periphery of the filter media 12. Any suitable material may be used for the frame 20, such as metal or rigid polymeric materials. Most preferably, cardboard or pasteboard is formed into the desired shape and the web secured thereto, such as by a suitable adhesive.

In one embodiment of the invention, the filter media includes a supporting polymeric mesh or scrim (not shown)

that is positioned adjacent one or both of the first major surface 14 or second major surface 16 of the web. The scrim acts to reinforce the filter media against the force of the airflow passing through the filter media. The scrim may be formed from a polymeric material or may be constructed of any other suitable material, such as an expanded metal. In the preferred embodiment of the invention, as illustrated in FIGS. 1 and 2, frame 20 includes an integral lattice 22 on one or both sides of the web 12 to provide the necessary support against the pressure of the air stream against the air filter 10.

The filter media need not be planar. As illustrated in FIGS. 1 and 2, the filter media may preferably be pleated or otherwise formed into a three dimensional surface to increase the amount of filter media surface area exposed to the air stream for a given cross sectional area of the filter.

The change indicator for the present invention is shown at 30 and in greater detail in FIGS. 3–5 and 6–8. Change indicator 30 includes air impervious patch 32 having a first major surface 34 and an opposing second major surface 36. Patch 30 represents a relatively small portion of the effective surface area of the filter media 12 so that the overall effectiveness of air filter 10 is not significantly impaired. For the purposes of this invention, the term "air impervious" includes not only materials that are solid and preclude the passage of air through them such as polymeric films, but also air resistive materials. By "air resistive" it is meant materials that are not totally impervious to the flow of air through them, but impede the flow of air through themselves to the extent needed to provide the shadowing qualities described hereinafter in regard to the change indicator of the present invention. Examples of air resistive materials include cloths, non-woven fabrics, paper or any other materials having similar properties.

Means are provided to secure the patch 32 on or adjacent to filter media 12. For the purposes of this invention, the term "adjacent' includes placing the indicator patch directly in contact with the filter media of the filter, as well as placing the indicator patch spaced from but in sufficient proximity to the filter media as to engender the "shadowing" effect described herein.

Preferably, indicator patch 32 is a flexible material, such as a flexible polymeric film, to enable the indicator patch to be placed directly on and conform closely to the profile of the filter media to which the indicator patch is secured, as shown particularly in FIGS. 1 and 2. However, it is within the spirit and scope of the present invention to mount the indicator patch to the frame 20 or the lattice 22 or any other suitable structure with the indicator patch spaced from the filter media 12.

Mechanical clips (not shown) may be provided that engage both the patch and the filter media 12, frame 20 or lattice 22 to secure the patch thereto. Any other suitable method may be employed to secure the patch 32 to the filter, such as ultrasonic bonding, heat sealing, stapling, sewing, and stitching, or the like. Preferably, a layer of adhesive 38 may be utilized to secure the patch to the filter 10. Any suitable adhesive may be employed, such as a heat-activated adhesive. Most preferably, a pressure sensitive adhesive is employed. Conveniently, a portion of a pressure sensitive adhesive tape may be used to construct the change indicator, with the polymeric film backing of the tape acting as the air impervious patch and the pressure sensitive adhesive layer of the tape being used to secure the tape portion to the air filter. The following is a non-exclusive list of pressure sensitive adhesive tapes that may be used to form the change indicator 30 of the present invention: Nos. 355, 810, 371, 373, 605, 610 and 821 pressure sensitive adhesive tapes available from the Minnesota Mining and Manufacturing Company of St. Paul, Minn.

Change indicator 30 further includes means for progressively indicating use and decreasing performance of the air filter. As is shown sequentially in FIGS. 3–5 and correspondingly in FIGS. 6–8, contaminants carried in the airflow in direction 18 encounter the air filter 10. The majority of the filter media 12 that is exposed to the airflow enables the airflow to travel through the filter media from first major surface 14 to the second major surface 16 and acts to entrap or remove contaminants therefrom in a normal fashion. As is expected, the greater the amount of contaminants trapped in the filter media, the greater the change in appearance of the filter. Generally, the filter media is a lighter color that gradually darkens as entrapped contaminants builds up in the filter media, although in some applications it may be desirable for the filter media to be a darker color and the contaminants act to gradually lighten the appearance of the filter. The change in color and appearance is dependent on the nature of the contaminants encountered. In most residential applications, it is preferable to provide a filter media that is white or light gray, with the normally encountered contaminants being dust and lint that gradually turn the appearance of the filter media to a dark gray or black. It is sufficient that the normal color of the filter media and the color of the contaminants be contrasting to enhance visual perception of the accumulation of the contaminants.

When the airflow encounters the relatively small area covered by patch 32, the airflow is diverted about the patch to adjacent uncovered portions of the filter media. As the diverted airflow travels about the periphery 40 of the patch, there is a zone 42 of relatively low pressure (compared to ambient pressure in the air stream) created by this "shadowing" effect adjacent the second major surface 36 of the patch and second major surface 16 of the filter media. This low-pressure zone 42 tends to divert the airflow adjacent the periphery 40 of patch 32 towards the low-pressure zone indicated generally at the center 44 of second major surface 34 of the patch. Over time, contaminants 46 from the diverted airflow also accumulate in the portion of the filter media 12 covered by the patch. This process of accumulation progresses from the portion of the filter media at the periphery 40 of the patch inwardly towards the portion adjacent center 44 of the patch. The remainder of the filter media accumulates contaminants at a relatively uniform rate at all portions exposed to the air stream.

In the embodiment illustrated in FIGS. 1–5 (excluding the embodiment of the present invention shown in FIG. 4a, discussed hereinafter), at least a portion of the patch 32 is light transmissive that extends generally from the periphery towards the center of the indicator patch. Preferably, the entire indicator patch is light transmissive. For the proposes of this invention, the term "light transmissive" includes materials that are transparent or translucent to a degree sufficient for visual perception of the filter media underlying the patch 32 through first major surface 34 of the patch 32.

Thus, as the major portion of the filter media changes appearance (e.g. darkens) during use due to the uniform accumulation of contaminants, the portion covered by the change indicator gradually changes appearance progressively from the periphery towards the center of the patch. The graduated change in appearance permits periodic visual inspection through the light transmissive qualities of the patch to determine the state of the filter and a convenient gage of the effectiveness of the air filter and the point at which the air filter should be cleaned or replaced.

Figure 4:
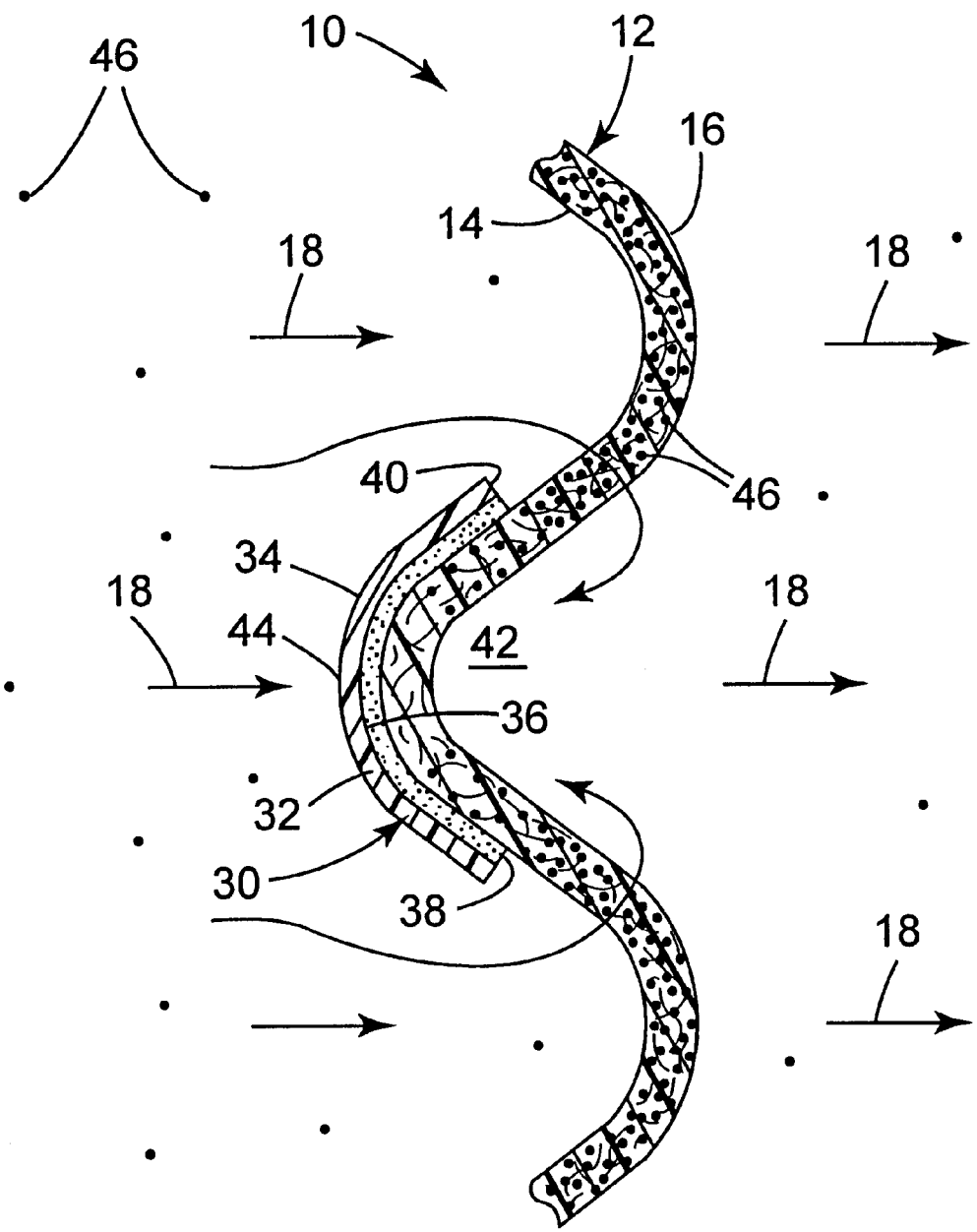
FIG. 4 is a magnified partial cross sectional view of the air filter and change indicator of FIG. 3 in a second state.
Figure 4A:
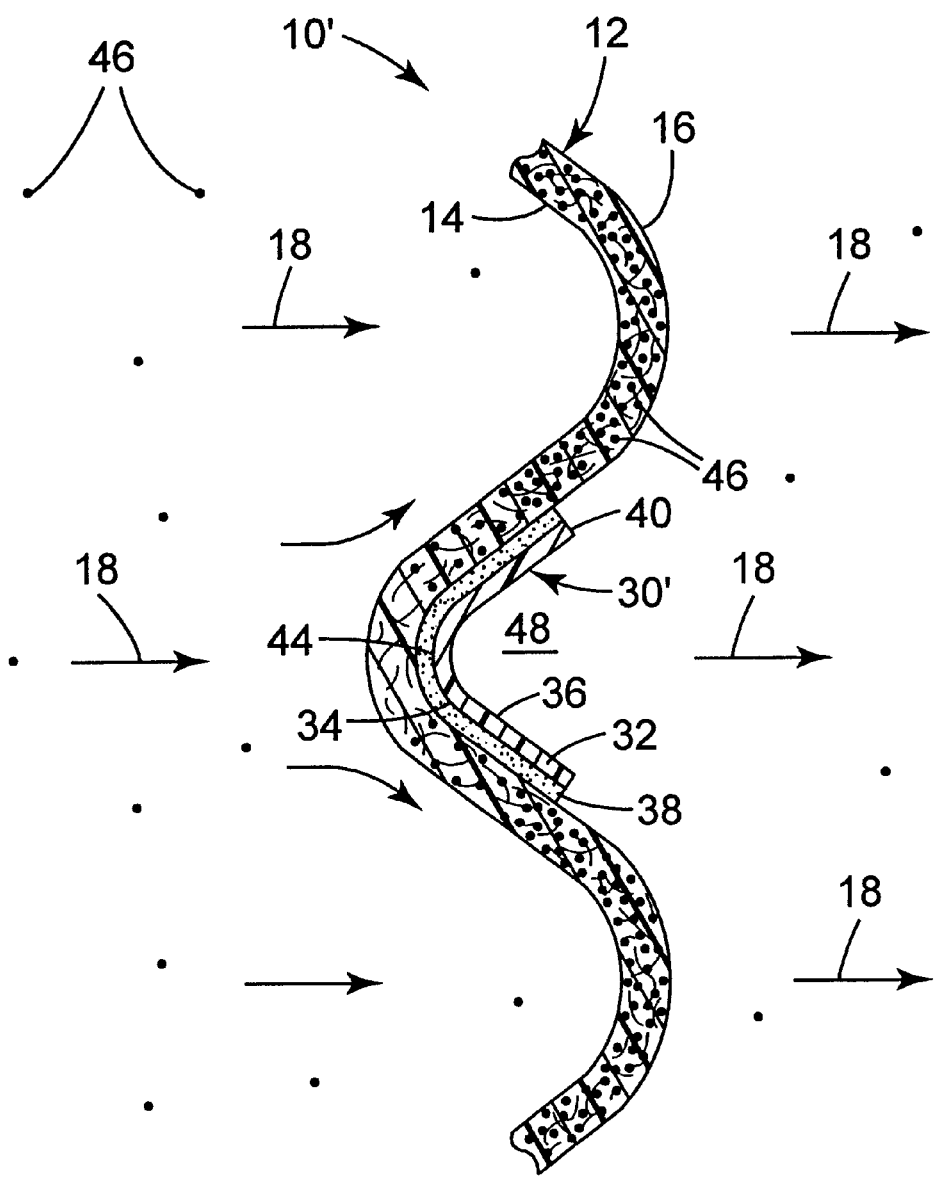
FIG. 4a is a magnified partial cross sectional view of an alternative embodiment of the air filter and change indicator of FIG. 4, with the change indicator located on the second major surface of the air filter.
Figure 5:
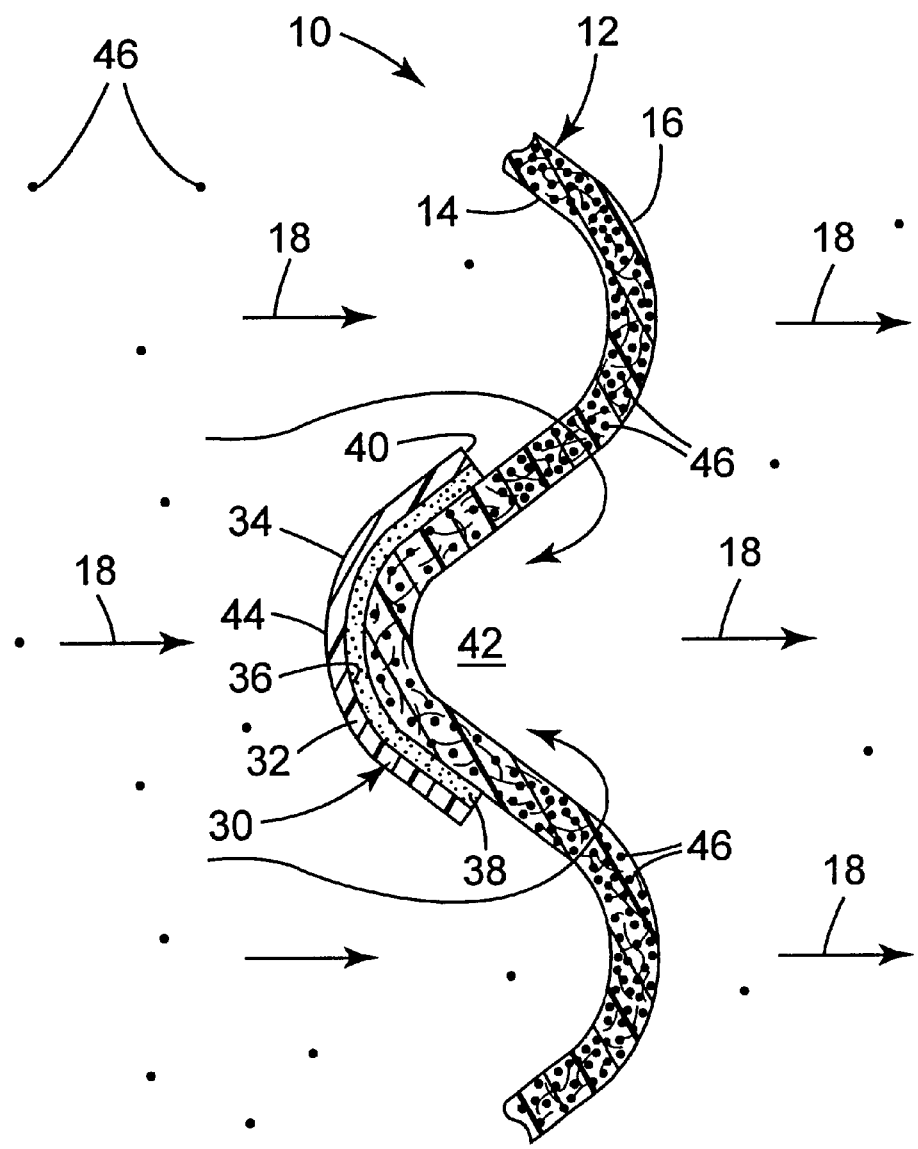
FIG. 5 is a magnified partial cross sectional view of the air filter and change indicator of FIGS. 3 and 4 in a third state.
Figure 6:
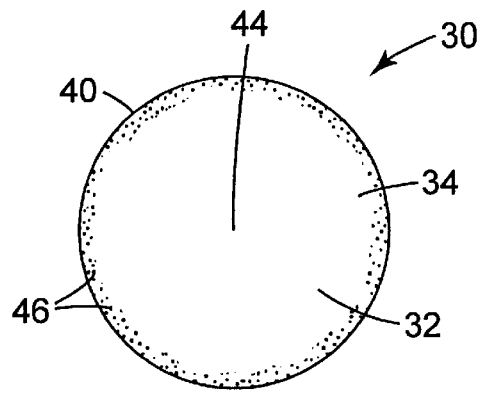
FIG. 6 is a magnified frontal view of the change indicator of FIG. 3 in the first state.
Figure 7:
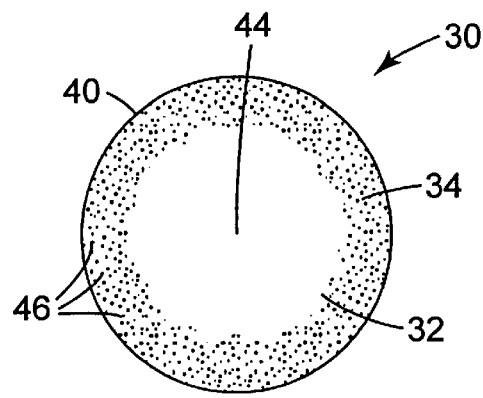
FIG. 7 is a magnified frontal view of the change indicator of FIG. 4 in the second state.
Figure 8:
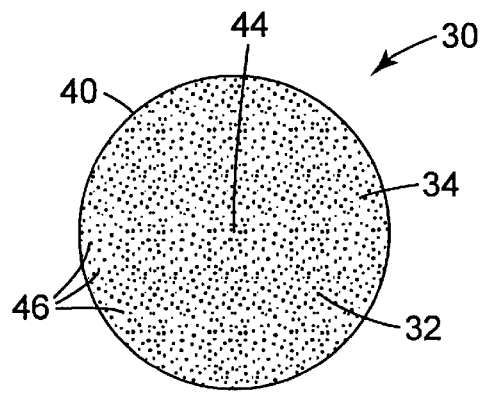
FIG. 8 is a magnified frontal view of the change indicator of FIG. 5 in the third state.

Referring now to FIG. 4a, an alternative embodiment 10' of the present invention is illustrated in which the change indicator 30' is mounted on or adjacent to the second major surface 16 of the filter media 12. In contrast to the low pressure zone created behind the indicator patch 30 shown in FIGS. 3–5, the indicator patch 30' of FIG. 4a impedes the encountered air stream so as to create a relatively high pressure zone 48 in front of patch 32. This relative high-pressure zone 48 acts to divert the air stream away from the patch and about the periphery 40 of the patch, in a reverse shadowing affect. In this manner, the accumulation of contaminants 46 in the filter media from the air stream progresses from the periphery towards the center 44 of the patch as described hereinabove with respect to the embodiment illustrated in FIGS. 3–5. It will be appreciated that in regard to this embodiment, the indicator patch need not be light transmissive, since the accumulation of contaminants is directly perceptible by looking at the first major surface 14 of the filter media. Thus, in all other respects, this embodiment 30' of the indicator patch is essentially the same as the embodiment 30.

Figure 9:
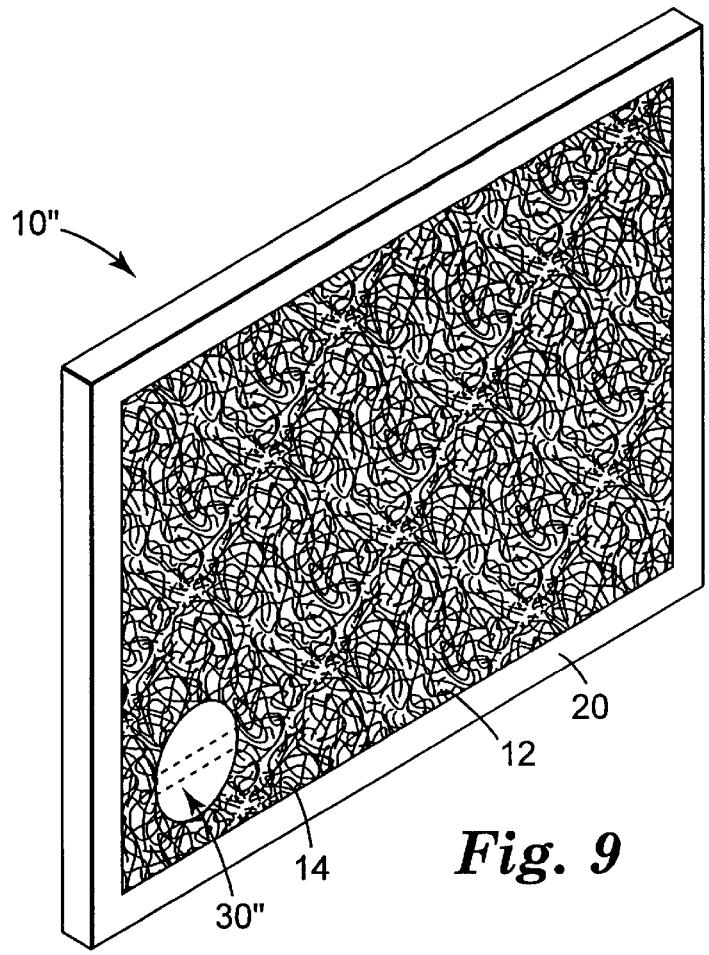
FIG. 9 is an isometric view of yet another embodiment of the present invention.
Figure 10:
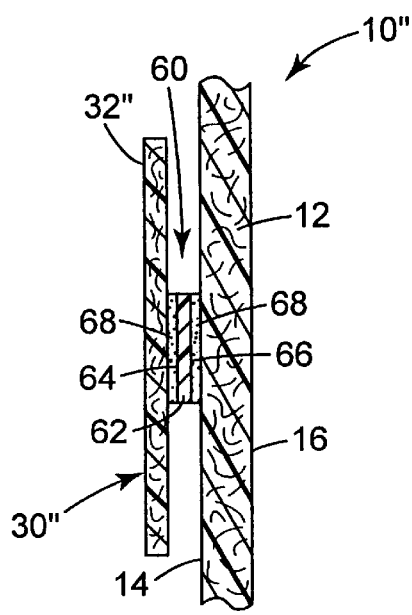
FIG. 10 is a magnified partial cross sectional view of the filter of FIG. 9 and the indicator patch.

Referring now to FIGS. 9 and 10, there is shown an embodiment 10" of the present invention with a change indicator 30" having an indicator patch 32" that may be placed on either first major surface 14 or second major surface 16 of the filter media. As illustrated in FIGS. 9 and 10, the indicator patch is preferably attached to the first major surface 14 of the filter media 12. Preferably, indicator patch 32" is constructed of an "air resistive" material and is not completely impervious to air or gas streams. Most preferably, the indicator patch material may be constructed of filter media material that accumulates or loads contaminants at a rate that may be different from that of the filter media 12 of the filter 10".

Any suitable means may be employed to attach the indicator patch 30" to the filter 10" or filter media 12. In the illustrated embodiment, it has been found convenient to employ a strip of doubled sided pressure sensitive adhesive tape 60. The double-sided pressure sensitive adhesive tape 60 includes a film backing 62 having a first major surface 64 and an opposing second major surface 66. A layer of pressure sensitive adhesive 68 is coated on both major surfaces 64 and 66 of the film backing strip 62 to secure the indicator patch to the filter. The following is a non-exclusive list of double sided pressure sensitive adhesive tapes that may be employed with this embodiment of the invention: Nos. 665, 136 and 137 available from the Minnesota Mining and Manufacturing Company of St. Paul, Minn.

It will also be appreciated that an alternative to double sided pressure sensitive adhesive tape is to employ a strip of pressure sensitive adhesive transfer tape (not shown) that has no film backing, but is a layer of pressure sensitive adhesive tape that may be used to adhere the indicator patch to the filter. The following is a non-exclusive example of a pressure sensitive adhesive tape that may be used in conjunction with the present invention: No. 924 available from the Minnesota Mining and Manufacturing Company of St. Paul, Minn.

The presence of the adhesive strip 60 or adhesive transfer tape acts as an air impervious layer that blocks the passage of the air stream through the indicator patch and creates the shadowing effect on the indicator patch itself.

Indicator patch 30" is particularly well adapted to embodiments of the filter in which the filter media includes two or more layers of filter media (not shown). For instance, the layer of filter material closest to first major surface 14 may have a filtering capacity for larger diameter contaminants, whereas the subsequent encountered layers of filter material are constructed to filter smaller diameter contaminants. In such a case, it may be desirable to provide an indicator patch that is representative of and may be calibrated to disclose the condition of one or more of the layers of the filter media that are not directly visually perceptible from the first major surface.

It will also be appreciated that although the illustrated shape of the indicator patches of the present invention is round, any suitable shape, such as square, rectangular, or triangular may be employed as is found advantageous in a particular application. In particular, a triangular shaped indicator patch enables an expanded scale to be established (preferably with indicia) that more efficiently displays the progressive accumulation of contaminants adjacent the indicator patch. The continuous and progressive indication of the accumulation of contaminants will still proceed from the periphery towards the center of whatever shape the indicator patch takes.

In another example, severing a segment of pressure sensitive adhesive tape from a roll of tape may conveniently form the patch and the rectangular segment produced thereby applied to a filter to form the indicator patch. This eliminates the need to form the patch by die cutting or a similar process that produces a preferred shape such as circular, but that also produces waste or weed material.

It will also be appreciated that the size and configuration of an indicator patch for a particular application may be calibrated to take into the account the characteristics of the filter media, the HVAC systems, the expected contaminants to be encountered and the air impervious qualities of the indicator patch material, along with any other pertinent factors to provide an accurate indication of the accumulation of the contaminants in the air filter.

Although not shown, various indicia may be imprinted on the indicator patch to allow a user to estimate the amount of use and remaining life of a filter. For instance, a row of parallel lines or concentric circles may be added to the patch extending from the periphery inwardly towards the center of the patch to facilitate quick and accurate reading of the progressive accumulation of the contaminants. Another approach would be to have words or alphanumeric markings that are in contrasting colors to the filter in both a new or completely used states. For instance, if the normal color of the filter media is white, indicia in a dark color may be added to the patch, such as "use", that is easily visible against the background of the filter media. When the filter media is loaded with accumulated contaminants, the appearance of the filter media changes to a darker color. The "use" indicium is then much harder to distinguish against the darker background. Correspondingly, indicia may be added to the patch, such as "change", in a light color that is hidden from view when viewed against the matching light color of the unused filter media. When the accumulation of contaminants is sufficient, the darker "use" indicium is hidden and the lighter colored "change" indicium contrasts against the darker color of the filter media and is easily discernable.

It will also be appreciated that although the filter of the present invention has generally been described as being an air filter, the indicator patch of the present invention may be configured and constructed for use in filtering particulates from any gaseous flow, and is not limited to air.

The following are several non-exclusive examples of embodiments of the present invention:

EXAMPLES

Round patches of transparent tape were applied to the upstream face of 3M Filtrete brand furnace filters 16 inches by 20 inches by 1 inch (Catalog No. 9800). The tapes used were 3M brand #355 Packaging Tape and 3M brand Energy Saving Products Sealing Tape. Round patches of both 2" and 1" diameter of the #355 tape and 1" diameter round of the Energy tape were applied to the surface of the pleated filters with the adhesive side against the filter media and lightly pressed down. The filters were measured for pressure drop at 300 feet per minute (fpm) when clean or unused. The filters were then used in a residential environment for a period of two months with a fan continuously running to accelerate the filter loading. The filters were periodically measured for pressure drop in a laboratory setting at a velocity of 300 fpm. The progression of the discoloration was measured along with the pressure drop. Each of the tape spots showed similar progression of the discoloration, regardless of spot size or tape type.

| Day | Pressure drop (Pa) | Color penetration from edge (Centimeters) |
| --- | --- | --- |
| 1 | 60.0 | 0 |
| 12 | 62.5 | .25 to .50 |
| 21 | 67.5 | .50 to .75 |
| 33 | 70.0 | .50 to .75 |
| 42 | 75.0 | .75 to 1.00 |
| 63 | 82.5 | .75 to 1.00 |

The present invention has now been described with respect to several embodiments thereof. It will be apparent to those skilled in the art that many changes can be made to the embodiments described herein without departing from the spirit and scope of the present invention. Thus the scope of the present invention should not be limited to the structures described herein, but only by the structures described in the language of the claims and equivalents of those structures. It is also to be understood that the contents of all patents identified herein are incorporated by reference in their entirety.

For instance, although the filter and change indicator of the present invention may be used as shown and described hereinabove without any supplemental apparatus and relying solely on visual inspection to monitor the state of use of the filter, it will be recognized that it is within the spirit and scope of the present invention to provide remote sensing apparatus, such as electronic optical sensors that monitor the color of the indicator patch. The optical sensor may provide a signal automatically when the color of the indicator patch achieves a predetermined state. This arrangement, although requiring additional apparatus, may be found to be advantageous in certain applications.

It will also be appreciated that, if desired, more than one indicator may be employed as part of the change indicator, with each of the indicator patches having differing characteristic sensitivity to loading of contaminants on the filter media.

What is claimed is:

1. A filter for filtering particulate contaminants from an air stream, comprising:
    (a) a filter media for filtering the particulate contaminants from the air stream, said filter media having a first major surface and a second major surface for air flow through said filter media from said first major surface to said second major surface;
    (b) an air impervious indicator patch having a first major surface and a second major surface, a periphery and a center; and
    (c) means adapted to support said indicator patch at a desired location adjacent a portion of one of said first major surface or second major surface of said filter media;
    (d) wherein said indicator patch is adapted to impede the air flow through said filter media and divert the air stream so that contaminants are progressively accumulated in said filter media from said periphery towards said center of said air impervious indicator patch as an indication of use of the filter.

2. The filter of claim 1, wherein said indicator patch is attached to the filter with said second major surface of said indicator patch adjacent to said first major surface of said filter and wherein at least a portion of said indicator patch is light transmissive to enable visual perception of the portion of the filter media adjacent said indicator patch.

3. The filter of claim 2, wherein said indicator patch includes a layer of pressure sensitive adhesive on said second major surface of said indicator patch and said indicator patch is adhered to said first major surface of said filter media by said layer of pressure sensitive adhesive.

4. The filter of claim 1, wherein said indicator patch is mounted to said filter with said first major surface of said indicator patch adjacent to said second major surface of said filter media.

5. The filter of claim 4, wherein said indicator patch includes a layer of pressure sensitive adhesive on said first major surface of said indicator patch and said indicator patch is adhered to said second major surface of said filter media by said layer of pressure sensitive adhesive.

6. The filter of claim 1, wherein said filter media comprises entangled fibers, at least some of which are electrostatically charged electret fibers.

7. The filter of claim 6, wherein said web of said filter media is joined to at least one reinforcement scrim.

8. The filter of claim 1, further including a frame connected to said filter media for supporting said filter media.

9. The filter of claim 8, further including a lattice adjacent at least one of said first and said second major surfaces of said filter media for supporting said filter media.

10. The filter of claim 1, wherein said indicator patch is constructed of an air resistive filter media and wherein said means for attaching said indicator patch adjacent said filter media includes one of an air impervious strip of double sided pressure sensitive adhesive tape and air impervious pressure sensitive adhesive transfer tape;
wherein said strip of one of said air impervious strip of double sided pressure sensitive adhesive tape and air impervious pressure sensitive adhesive transfer tape is adapted to impede the air flow through said indicator patch and divert the air stream so that contaminants are progressively accumulated in said indicator patch from said periphery towards said center of said indicator patch as an indication of use of the air filter.

11. A change indicator for use with a filter having a filter media for filtering particulate matter from a gaseous stream passing through the filter media from a first major surface to a second major surface of the filter media, comprising:
    (a) a gas impervious indicator patch; and
    (b) means adapted to support said indicator patch at a desired location adjacent to a portion of one of the first major surface or second major surface of the filter media;
    (c) wherein the flow of the gas through the filter is impeded and diverted adjacent said indicator patch so that contaminants in the gas are progressively accumulated in the filter media from said periphery towards said center of said gas impervious indicator patch.

12. The change indicator of claim 11, wherein said means for attaching said patch to the filter includes a portion of said layer of pressure sensitive adhesive on said indicator patch.

13. The change indicator of claim 11, wherein the gas is air.

14. A filter for filtering particulate contaminants from a gas stream, comprising:
   (a) a filter media for filtering the particulate contaminants from the gas stream, said filter media having a first major surface and a second major surface for gas flow through said filter media from said first major surface to said second major surface;
   (b) a gas impervious indicator patch having a first major surface and a second major surface, a periphery and a center; and
   (c) means adapted to support said indicator patch at a desired location adjacent a portion of one of said first major surface or second major surface of said filter media;
   (d) wherein said indicator patch is adapted to impede the gas flow through said filter media and divert the gas stream so that contaminants are progressively accumulated in said filter media from said periphery towards said center of said gas impervious indicator patch as an indication of use of the filter.

* * * * *